P. H. LACEY.
AUTOMATIC SAFETY DEVICE FOR PREVENTING OVERLOAD ON MOTORS AND OTHER DRIVING ELEMENTS.
APPLICATION FILED JAN. 2, 1918.

1,274,722.

Patented Aug. 6, 1918.

Inventor:
Paul H. Lacey,
by Charles O. Sherry,
his Atty.

UNITED STATES PATENT OFFICE.

PAUL H. LACEY, OF CHICAGO, ILLINOIS.

AUTOMATIC SAFETY DEVICE FOR PREVENTING OVERLOAD ON MOTORS AND OTHER DRIVING ELEMENTS.

1,274,722.   Specification of Letters Patent.   Patented Aug. 6, 1918.

Application filed January 2, 1918. Serial No. 209,875.

*To all whom it may concern:*

Be it known that I, PAUL H. LACEY, a citizen of the United States, and a resident of Chicago, county of Cook, and State of Illinois, have invented certain new and useful Improvements in Automatic Safety Devices for Preventing Overload on Motors and other Driving Elements, of which the following is declared to be a full, clear, and exact description.

This invention relates to automatic safety devices for preventing overloads on motors and other driving elements, and its primary object is to provide means whereby, when excessive or undue strains are placed upon the motor or other source of power, the device or machine which is driven from the motor will be automatically uncoupled therefrom until the overload has been eliminated and the load is made normal. Another object is to provide a safety device of simple, substantial and efficient construction that may be readily applied to shafting of any description, and which will automatically uncouple said shafting from the load when it becomes excessive. Other objects and advantages will be found in the following specification and with all of said objects and advantages in view, this invention consists in two revoluble bodies, one fast to the power shaft and one loose with respect to it, and one or more spring pressed, depressible elements carried by one body and normally held in power transmitting engagement with the other under normal loads, but adapted to be depressed against the spring action to relieve the power shaft of any overloads. The invention further consists in the several novel features hereinafter fully set forth and claimed.

Figure 1:
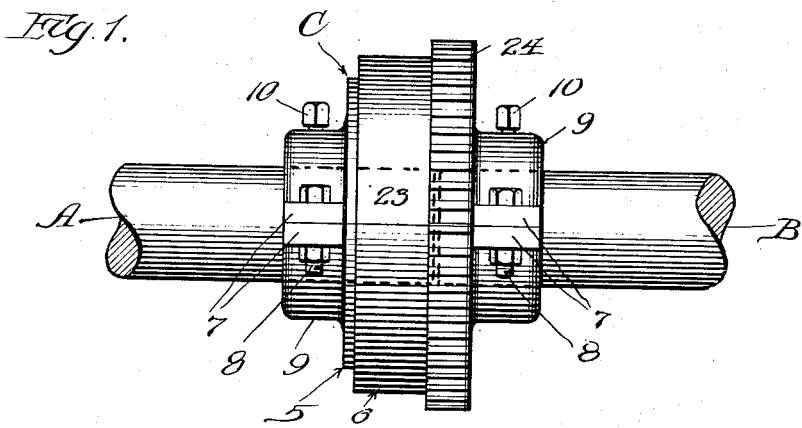
Figure 2:
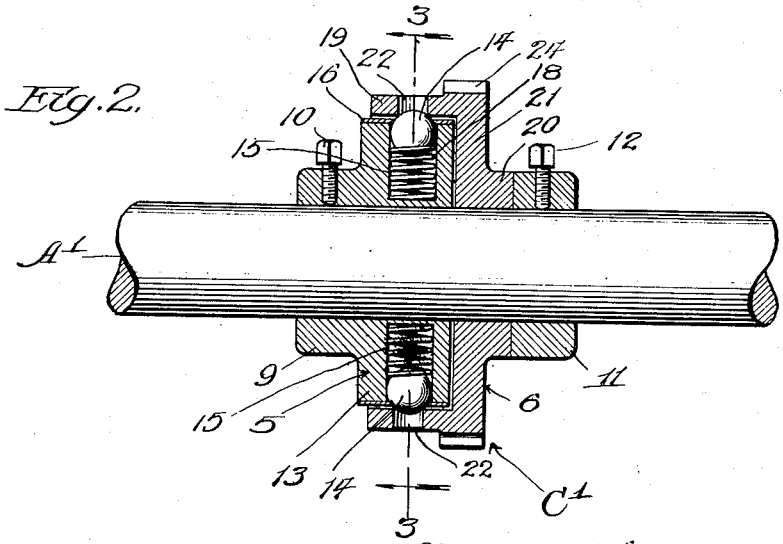
Figure 3:
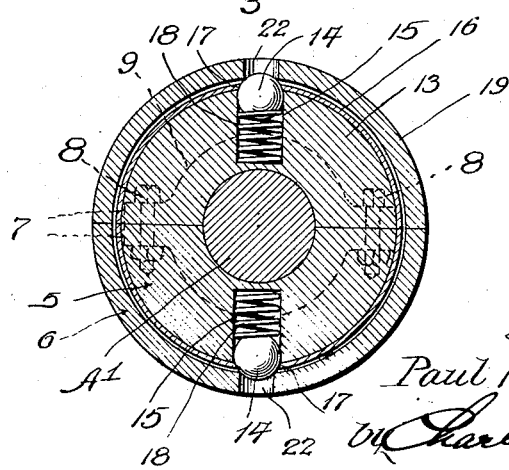

This invention is clearly illustrated in the accompanying drawings, in which:

Figure 1, is a side elevation of a simple embodiment of my invention applied to two alined shafts; Fig. 2, is a central longitudinal section of the device, slightly modified and applied to power or drive shaft, and Fig. 3, is a vertical cross section taken on the line 3—3 of Fig. 2.

Referring to said drawing and first to Fig. 1, the reference character A, designates a power or drive shaft and B, a driven shaft. The power shaft A, may be driven directly from an electric or other motor, and the driven shaft B, may be the main shaft of any piece of machinery or mechanism to be driven from said power shaft, or the shafts A, B, may comprise any driving and driven shafts of any mechanism where it is desirous of providing a safety device for preventing overloads on the driving shaft.

The safety device C, comprises a driving member 5, and a driven member 6. Where the device is employed between two abutting, alined shafts, one member 5, is rigidly secured to one shaft A, and the other member 6, to the other shaft B. Each member may be split and the two sections of each may be provided with clamp ears 7, for receiving bolts 8, whereby the two sections may be clamped together upon the shaft. In this form of the invention, both members 5, 6, are provided with hubs 9, and set screws 10, threaded in the hubs, bear against the shafts to fixedly hold said members in place.

Where the safety device is employed between a power or drive shaft and any machine or device to be driven therefrom, the device $C^1$ (see Figs. 2, 3) is mounted on the driving shaft $A^1$, and one member 5, fixedly secured thereto by a set screw 10, and by clamp bolts 8, as in the case of the device illustrated in Fig. 1. The member 6, is loosely mounted on the shaft $A^1$, and held in place by a collar 11, fixedly secured to the shaft by a set screw 12. Except for this difference, the two forms of the device illustrated may be the same in all essential respects.

The member 5, has a head or enlarged portion 13, which may be round, if desired, and in said head are a plurality of spring pressed dogs or power transmitting members 14, which normally protrude beyond the face of the head but are prevented from being discharged from the recesses or sockets 15, in which they are located, by a ring 16, which is slipped upon the head and has holes 17, therein of less diameter than the dogs or engagement members 14, thus permitting said dogs to protrude beyond the outer face of the member 5. The dogs are here illustrated in the form of balls, and are pressed outward by coiled compression springs 18, seated on the bottoms of the recesses or sockets 15, and bearing against the balls.

The other member 6, of the device has a cylindrical band or flange 19, which surrounds the head 13, and is connected to the hub portion 9, (see Fig. 1) or to the hub portion 20, (see Fig. 2) by a radial plate or web 21. In the band or flange portion 19, are holes or recesses 22, of less diameter than the balls 14, the inner edges of which holes engage with the protruding sides of the balls, thereby affording the power transmitting connection between the two members 5, 6.

The cylindrical face 23, of the member 6, may act as a pulley to receive a belt, and the member 6, may be provided with circumferentially arranged teeth or threads 24, to enable the device to be used as a gear, worm or sprocket wheel for transmitting power from the drive shaft to a driven shaft. The teeth may or may not be omitted from the device when employed between two abutting, alined shafts, as illustrated in Fig. 1, and the member 6, may be used as a drive pulley or gear wheel, worm gear or sprocket wheel, when used between a driven shaft, as seen in Fig. 2, and some other driven shaft.

In use, any desired number of the safety devices may be employed on a line shaft, one for each machine which is to be driven from the shaft. This line shaft may be driven by an electric motor, as usual. When applied to a line shaft, the form illustrated in Fig. 2, is used except at the end of the line shaft, the form illustrated in Fig. 1, may be used between the line shaft and an abutting, alined one. Assuming that the motor is designed to carry a certain predetermined load, power will be transmitted by the safety devices to the driven shafts. If, however, any of the driven machines becomes clogged for any reason, and a greater load is put upon the motor than it has capacity for, the power transmitting connections between the members 5, 6, are forced back against the action of the springs by reason of the excess lateral pressure against the sloping or curved sides of the power transmitting connections, and the drive shaft will be free to rotate, and any danger of burning the motor will be eliminated. When subjected to an overload the balls will roll around on the inner face of the band and snap past the depressions in the band.

Obviously the spring pressure must be calculated to correspond with the load that the motor will carry, but in each case this is merely a matter of calculation, and can be easily determined.

The advantages of this safety device are readily apparent. It can be easily and readily installed, can be made in any desirable size, and can be made to carry any load required. It is automatic, requires no attention after being installed, and is effective in operation.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In a safety device for transmitting power, a revoluble driving member having a radial socket formed therein, a ball in said socket, a coiled compression spring in said socket, pressing against said ball, a ball retaining band encircling said member and having an aperture formed therein of less diameter than said ball, through which said ball protrudes, and a revoluble driven member having a recess of less diameter than the ball, into which said ball protrudes.

2. In a safety device for transmitting power, a revoluble driving member having radial sockets formed therein, a ball in each socket, a coiled compression spring in said sockets, pressing against said balls, a ball retaining band encircling said member and having apertures formed therein of less diameter than said balls through which said balls protrude, and a revoluble driven head having an annular part surrounding said driving member, said part being formed with recesses of less diameter than the balls, into which the balls protrude.

3. In a safety device for transmitting power from a driving shaft to a driven element, a revoluble head fixedly secured to the driving shaft and having a plurality of radial sockets, an outwardly spring pressed ball in each socket, a ball retaining band encircling said head, said band being formed with recesses of less diameter than the balls for receiving the protruding portions of said balls, and a driven annular member surrounding said head and band and having recesses of less diameter than the balls, said driven member having power transmitting means on its periphery.

4. In a safety device for transmitting power from a driving shaft, a driving and a driven member mounted upon said shaft, the driving member being fixedly secured thereto and the driven member being loosely mounted against endwise movement of the shaft, and being provided with gear teeth, the driving member being provided with sockets, balls in said sockets protruding therefrom, and coiled compression springs in said sockets pressing against said balls, a ball retaining band encircling said driving member, and having apertures of less diameter than the ball through which the balls protrude, the driven member being formed with depressions of less diameter than the balls for receiving the protruding ends of the balls, said driven member having power transmitting means formed thereon.

PAUL H. LACEY.